US010423599B2

(12) United States Patent
Gopi et al.

(10) Patent No.: US 10,423,599 B2
(45) Date of Patent: Sep. 24, 2019

(54) GLOBAL AND LOCAL TEMPORARY DATABASE TABLES

(71) Applicant: SAP SE, Walldorf (DE)

(72) Inventors: Ajalesh P Gopi, Bangalore (IN); Naveen Kolli, Bangalore (IN)

(73) Assignee: SAP SE, Walldorf (DE)

( * ) Notice: Subject to any disclaimer, the term of this patent is extended or adjusted under 35 U.S.C. 154(b) by 264 days.

(21) Appl. No.: 14/977,914

(22) Filed: Dec. 22, 2015

(65) Prior Publication Data

US 2017/0177640 A1  Jun. 22, 2017

(51) Int. Cl.
*G06F 16/22* (2019.01)
*G06F 16/25* (2019.01)

(52) U.S. Cl.
CPC ........ *G06F 16/2282* (2019.01); *G06F 16/252* (2019.01)

(58) Field of Classification Search
CPC ......... G06F 17/30339; G06F 17/30551; G06F 16/2365; G06F 16/2282; G06F 16/2477; G06F 16/252
USPC ....... 707/693, 722, 602, 649, 696, 703, 720, 707/756, 803, 607, 611, 613, 638, 672, 707/688, 690, 692, 704, 714, 716, 718, 707/725, 741, 746, 752, 753, 759, 763, 707/770, 822; 710/5, 22; 711/103, 104, 711/113, 114, 129, 133, 135, 145, 146, 711/154, 161
See application file for complete search history.

(56) References Cited

U.S. PATENT DOCUMENTS

| 5,819,251 | A  | * | 10/1998 | Kremer | ............ | G06F 17/30595 |
| 5,930,795 | A  | * | 7/1999  | Chen   | ................. | G06F 17/30474 |
| 6,684,203 | B1 | * | 1/2004  | Waddington | ...... | G06F 17/30445 707/714 |
| 2008/0288561 | A1 | * | 11/2008 | Croisettier | ........ | G06F 17/30551 |
| 2013/0117526 | A1 | * | 5/2013  | Florendo | ............... | G06F 3/0622 711/171 |
| 2014/0032598 | A1 | * | 1/2014  | Jakobs | .............. | G06F 17/30542 707/780 |

OTHER PUBLICATIONS

Kessler ("Where ABAP Meets SAP HANA"; SAPinsider, vol. 15, Issue 4, Oct. 1, 2014) (Year: 2014).*

* cited by examiner

*Primary Examiner* — Jay A Morrison
*Assistant Examiner* — Ken Hoang
(74) *Attorney, Agent, or Firm* — Jones Day (57) ABSTRACT

Systems and methods for creating and populating temporary database tables with intermediate data that can be preserved once a database application session ends and used outside of the instant database operation without storing this data in persistent memory are provided. A local temporary database table may be used only in the local instance of a database application, and a global temporary table makes intermediate data available across multiple applications and multiple application instances.

12 Claims, 5 Drawing Sheets

GLOBAL AND LOCAL TEMPORARY DATABASE TABLES

FIELD OF THE INVENTION

This disclosure relates to a system and method for the creation and management of temporary database tables.

BACKGROUND

Relational and non-relational databases are popular tools for organizing data and for retrieving data for subsequent review and analysis. These databases frequently handle large amounts of related or disparate data, and can be deployed to support a variety of applications.

However, the data structures generally employed in databases are designed to access data infrequently, because this process consumes time and system resources and may create a "bottleneck" for system performance. This is a particular concern for relational databases, which may involve large amounts of data and data structures, and require complex coding to present database calls or otherwise query the database, as well as to communicate with user applications.

Due to the complexity of the data and the required coding, a large investment of time and labor resources may be necessary to create a functional database, as well as to validate the data and ensure the coding is operating properly. Another consequence of this size and complexity is that the database and the associated application and coding may become unwieldy, and specialized coding with diminished portability may be necessary to query a particular database in an efficient manner.

Accordingly, there is a need to improve the operation of databases and processes for querying a database, to reduce the demand on system resources and provide cost-effective database functionality for a wide variety of applications.

SUMMARY OF THE INVENTION

One solution to these issues is the use of temporary database tables. Temporary tables may be created at run-time and store intermediate data. Intermediate data may be persistent in the database while the application is running, and is deleted when the database application exits.

Embodiments of the present invention provide systems and methods for creating temporary database tables that can be preserved once the database application session ends and used outside of the instant database operation without storing this data in persistent memory. Embodiments of the present invention also provide for shifting database calculations and operations from the application software layer to the database software layer, to take advantage of the greater processing power and system resources available on the database layer. In doing so, embodiments of the present invention will allow software developers and computer users the ability to get the full benefit of the temporary table, without the need for computationally-expensive writing of intermediate data to persistent memory.

Embodiments of the present invention will be described in detail in the exemplary embodiments presented in the drawings and disclosure set forth below.

DETAILED DESCRIPTION

Exemplary embodiments of the present invention provide database systems and methods for creating temporary database tables.

Temporary database tables are tables created by a database environment during one or more database operations. Temporary tables may be created in support of a database operation at run-time, i.e., when this operation is being performed. Temporary tables may store large amounts of intermediate data generated by the database operation, and may be populated with data generated by querying, retrieval, or other database functions. It will be appreciated that temporary tables may be adapted to store intermediate data created by any mode of data generation. In doing so, temporary tables offer a software developer or user the ability to store the intermediate data for subsequent access before the database application exits. Once the database application exits, the temporary table is deleted, without being written to persistent memory.

Temporary tables may be categorized as local or global. A local temporary table is a table used only in the local instance of a database application, and the intermediate data stored in a local temporary table is available only to that application instance. In contrast, a global temporary table makes intermediate data available across multiple applications and multiple application instances, or across multiple networked client devices or database servers.

Temporary tables may perform all of the functions, operations, queries, and routines a given database environment supports for a persistent table. Exemplary database statements and clauses supported by temporary tables include Structured Query Language (SQL) statements such as INSERT, SELECT, UPDATE, DELETE, CALL, JOIN, and WHERE, for example, but any arithmetic, comparison, and logical operations may be performed.

SAP® HANA is a widely popular in-memory computing platform that combines application processing, database, and integration processing into a single platform, and is an example of a platform that employs temporary database tables. HANA supports both local and global temporary tables. Applications for HANA may be developed in using the Advanced Business Application Programming language (ABAP) to and may employ SQL for querying, as shown by the example embodiments described herein. It will be understood that invention is not so limited, and this concept may be applied to any database platform and programming, instructions, processes, and logic. Software in accordance with this invention may employ classes as used in object-oriented programming, but the invention is applicable to all database programming implementations.

Temporary tables are of great value to database users and developers by improving database performance and decreasing system resources demand. Since temporary tables are deleted when the database application session ends, the intermediate data stored in these tables is lost. Temporary tables according to embodiments of the present invention advantageously make the intermediate data available for use in calculations in other applications outside of the database application or environment, giving users and developers the full benefit of the intermediate data, without the need to dedicate system resources to, and diminish system performance by, writing the intermediate data to persistent memory.

Another benefit of temporary tables according to embodiments of the present invention makes the temporary table and the stored intermediate data available for calculations and processing on the database software layer, not the application software layer. This allows database systems to employ the greater processing power of the servers or other database devices that support relational databases to realize improved computer performance, as opposed to carrying out this processing that on a client device or the application layer, particularly when the client device is a desktop computer or mobile device.

The following example embodiments are described with reference to relational databases. The present invention is not so limited, however, and the features discussed below may be readily applied to non-relational databases and other database implementations as needed.

Figure 1:
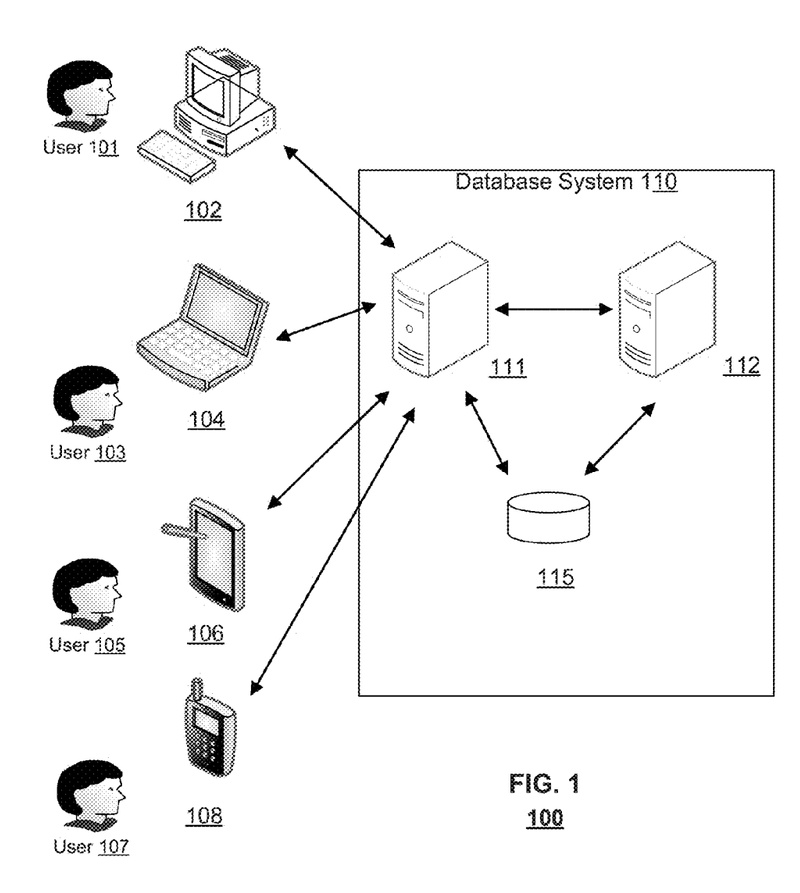
FIG. 1 is a block diagram showing a database system supporting a database environment in which temporary tables can be created according to an exemplary embodiment.

FIG. 1 illustrates a computer system 100 implementing a database environment containing at least one relational database, which one or more users may access using client machines. In the embodiment of FIG. 1, users 101, 103, 105, 107 access the database environment using one or more client devices 102, 104, 106, 108. The client devices may be a desktop computer, a laptop computer, a tablet computer, a smartphone, a server, a personal digital assistant, a palmtop computer, or other portable computing device, or any combination of these devices. If multiple client devices are employed, a data communication between the devices can be implemented using wired, wireless, or network connections.

The computer system 100 further includes a database system 110. The database system 110 may one or more database servers or other database hosting devices, shown as database servers 111, 112 in FIG. 1, which support one or more relational databases 115. The client devices 102, 104, 106, 108 may create data connections with database servers 111, 112 using wired, wireless, or network connections. Through these connections, the users can query the database, analyze the received data, or execute any other functionality of a given database application.

It will be appreciated that the database system may be deployed across any platform accessible by the client devices, such as a closed or local network, an internet-centric network, a cloud platform, and may utilize desktop databases and mobile databases, as well as in-memory databases across these platforms. These platforms may be supported by one or more database servers.

Figure 2:
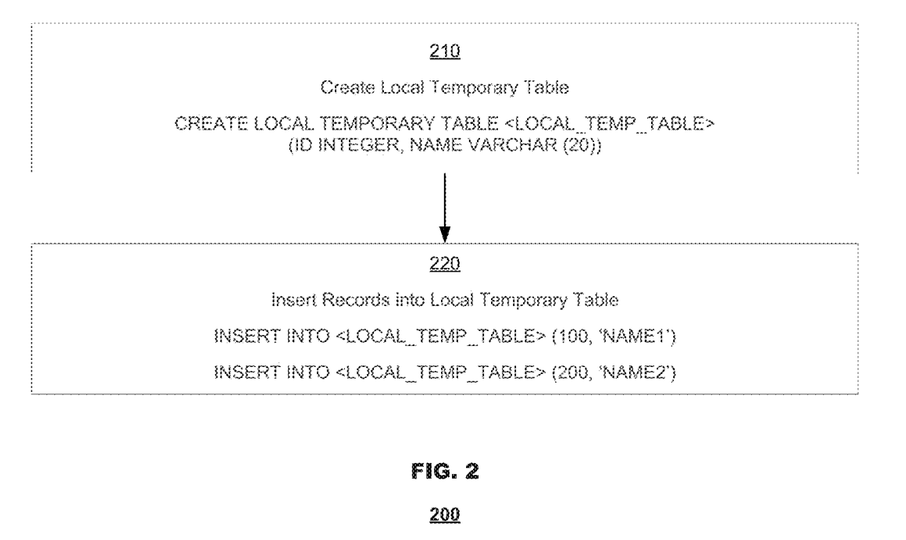
FIG. 2 is a flow chart of a software process with supporting syntax for creating a local temporary database table according to an exemplary embodiment.

FIG. 2 is a flow chart of a software process 200 and supporting syntax for creating and populating a local temporary database table according to an exemplary embodiment. The syntax shown in FIG. 2 is written in SQL, but it will be understood that the present invention may be applied to any database programming, instructions, processes, and logic.

The method shown in FIG. 2 occurs in two steps, a local temporary table creation step 210 and a local temporary table populating step 220. As a local temporary table, this table makes intermediate data available only within the local instance of the database application.

In the local temporary table creation step 210, the database application receives an instruction to create a local temporary table. As illustrated in FIG. 2 this instruction is written in SQL and has the form:
CREATE LOCAL TEMPORARY TABLE <LOCAL_TEMP_TABLE>(ID INTEGER, NAME VARCHAR (20))

The CREATE LOCAL TEMPORARY TABLE keyword is used to create the local temporary table. As this keyword is for the creation of a local temporary table, this table will be used only in the local instance of a database application. This instruction may be given upon the generation of intermediate data for entry in this table, or in anticipation of the subsequent generation of intermediate data, as the database application requires.

The <LOCAL_TEMP_TABLE> parameter specifies the name of the local table, and the parameters within the parentheses define the names and data types of the columns in this table. In the example embodiment illustrated in FIG. 2, the first column will be the record ID having an integer type, and the second column will be the NAME having a variable character type with a maximum length of 20 characters.

The execution of this instruction will cause the database system to create a new local temporary table named with the value of "<LOCAL_TEMP_TABLE>" and holding records including an "ID" and a "NAME." This table is empty, and accordingly the next step is to populate this table with intermediate data.

As noted above, temporary tables are created to store intermediate data generated during a database operation. Once intermediate data is generated, the local temporary table may be populated with this data, as is illustrated in step 220.

In the local temporary table populating step 220, the database application receives an instruction to insert intermediate data into an existing local temporary table. As illustrated in FIG. 2, these instructions are written in SQL and have the form:
INSERT INTO <LOCAL_TEMP_TABLE>(100, 'NAME1')
INSERT INTO <LOCAL_TEMP_TABLE>(200, 'NAME2')

The INSERT INTO keyword instructs the application that the data that follows is to be inserted into a local temporary table specified by name. In the example embodiment illustrated in FIG. 2, two data entries will be made. Both of these entries will be inserted into the <LOCAL_TEMP_TABLE> and will have ID and NAME values of "100," "NAME1" and "200," "NAME2," respectively.

Upon completion of step 220, the local temporary table contains two records of intermediate data. This data can now be accessed and used as needed by the local instance of the database application.

Figure 3:
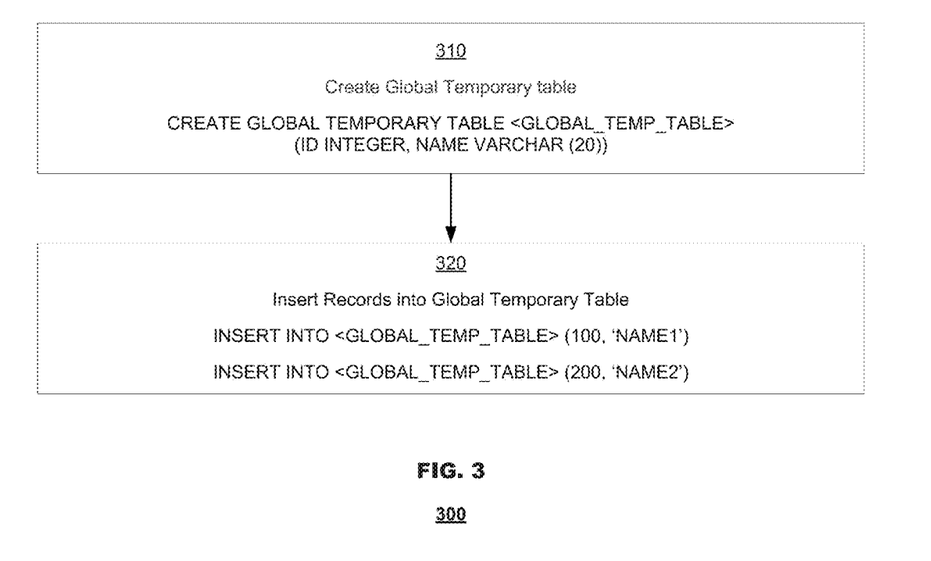
FIG. 3 is a flow chart of a software process with supporting syntax for creating and populating a global temporary database table according to an exemplary embodiment.

FIG. 3 is a flow chart of a software process 300 and supporting syntax for creating and populating a global temporary data according to an exemplary embodiment. The syntax shown in FIG. 3 is written in SQL, but it will be understood that the present invention may be applied to any database programming, instructions, processes, and logic.

The method shown in FIG. 3 occurs in two steps, a global temporary table creation step 210 and a global temporary table populating step 220. As a global temporary table, this table makes intermediate data available across multiple applications and multiple application instances.

In the global temporary table creation step 310, the database application receives an instruction to create a local temporary table. As illustrated in FIG. 3 this instruction is written in SQL and has the form:

CREATE GLOBAL TEMPORARY TABLE <GLOBAL_TEMP_TABLE>(ID INTEGER, NAME VARCHAR (20))

The CREATE GLOBAL TEMPORARY TABLE keyword is used to create the global temporary table. As this keyword is for the creation of a global temporary table, this table may be used across multiple applications and multiple application instances. This instruction may be given upon the generation of intermediate data for entry in this table, or in anticipation of the subsequent generation of intermediate data, as the database application requires.

The <GLOBAL_TEMP_TABLE> parameter specifies the name of the global table, and the parameters within the parentheses define the names and data types of the columns in this table. In the example embodiment illustrated in FIG. 3, the first column will be the record ID having an integer type, and the second column will be the NAME having a variable character type with a maximum length of 20 characters.

The execution of this instruction will cause the database system to create a new global temporary table named with the value of "<GLOBAL_TEMP_TABLE>" and holding records including an "ID" and a "NAME." This table is empty, and accordingly the next step is to populate this table with intermediate data.

As noted above, temporary tables are created to store intermediate data generated during a database operation. Once intermediate data is generated, the global temporary table may be populated with this data, as is illustrated in step 320.

In the global temporary table populating step 320, the database application receives an instruction to insert intermediate data into an existing global temporary table. As illustrated in FIG. 3, these instructions are written in SQL and have the form:

INSERT INTO <GLOBAL_TEMP_TABLE>(100, 'NAME1')
INSERT INTO <GLOBAL_TEMP_TABLE>(200, 'NAME2')

The INSERT INTO keyword instructs the application that the data that follows is to be inserted into a global temporary table specified by name. In the example embodiment illustrated in FIG. 3, two data entries will be made. Both of these entries will be inserted into the <GLOBAL_TEMP_TABLE> and will have ID and NAME values of "100," "NAME1" and "200," "NAME2," respectively.

Upon completion of step 320, the global temporary table contains two records of intermediate data. This data can now be accessed and used as needed across multiple applications and multiple application instances, or by multiple client devices 102, 104, 106, 108 or multiple database servers 111, 112, as illustrated in FIG. 1.

ABAP Managed Database Procedures (AMDPs) are tools that allow developers to write database procedures directly in ABAP, which may vary depending upon the underlying database. One feature of the present invention is to create temporary tables using AMDPs. A benefit of this feature is that temporary tables created by AMDPs may assist users and software developers by shifting code and execution of operations to the database layer, in order to perform the database calculations within the HANA platform. Another benefit of using AMDPs is more convenient and efficient execution of complex database operations.

Figure 4:
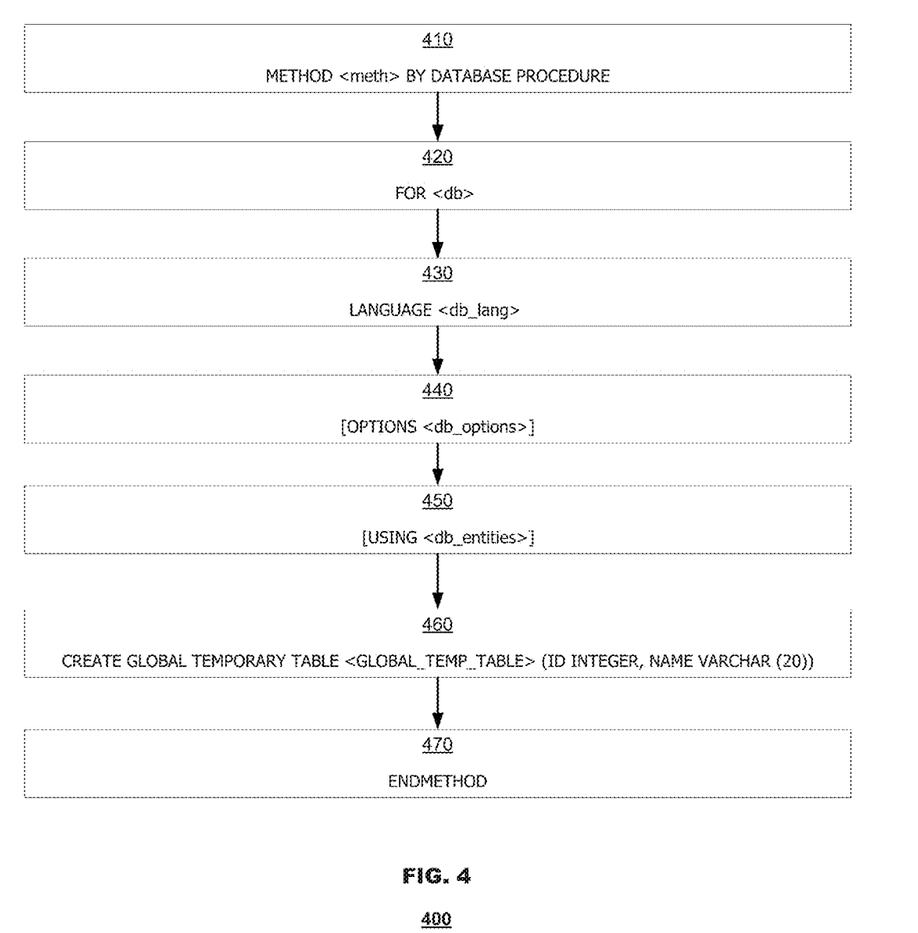
FIG. 4 is a flow chart of a software process with supporting syntax for creating and populating a temporary database table using ABAP Managed Database Procedures according to an exemplary embodiment.

FIG. 4 illustrates a software process 400 with supporting syntax for creating a HANA temporary table using an AMDP according to an example embodiment. This process may be used to create local or global temporary database tables, as needed.

This process contains series of instructions 410, 420, 430, 440, 450, 460, 470, executed in the exemplary sequence shown FIG. 4. First, instruction 410 marks the method implementation as an AMDP method for a database procedure having the name provided by the <meth> parameter. Instruction 420 specifies the database <db> that is the subject of this method.

Next, instructions 430, 440, 450 specify formal aspects of the method. Instruction 430 specifies the programming language for this method as identified in the <db_lang> parameter. The example embodiment illustrated in FIG. 4 uses SQL as the programming language, but it will be appreciated that any language capable of supporting AMDP development may be used. Instruction 440 specifies options for this procedure, such as making data READ-ONLY, for example, or other suitable option. The USING keyword in instruction 450 contains the name of the data dictionary tables used in this implementation, identified in the <db_entities> parameter.

Instruction 460 contains the programming statements necessary for the creation of the temporary table. As shown in FIG. 4, instruction 460 includes the CREATE GLOBAL TEMPORARY TABLE instruction described in step 310 of FIG. 3, but the CREATE LOCAL TEMPORARY TABLE instruction described in step 210 of FIG. 2 may be used here as well. It will be appreciated that while this example uses SQL statements, any programming language capable of supporting AMDP development may be used if specified in instruction 430.

Instruction 470 marks the end of this method. At this point, the software process 400 is complete and the AMDP method has created a new global temporary table.

Figure 5:
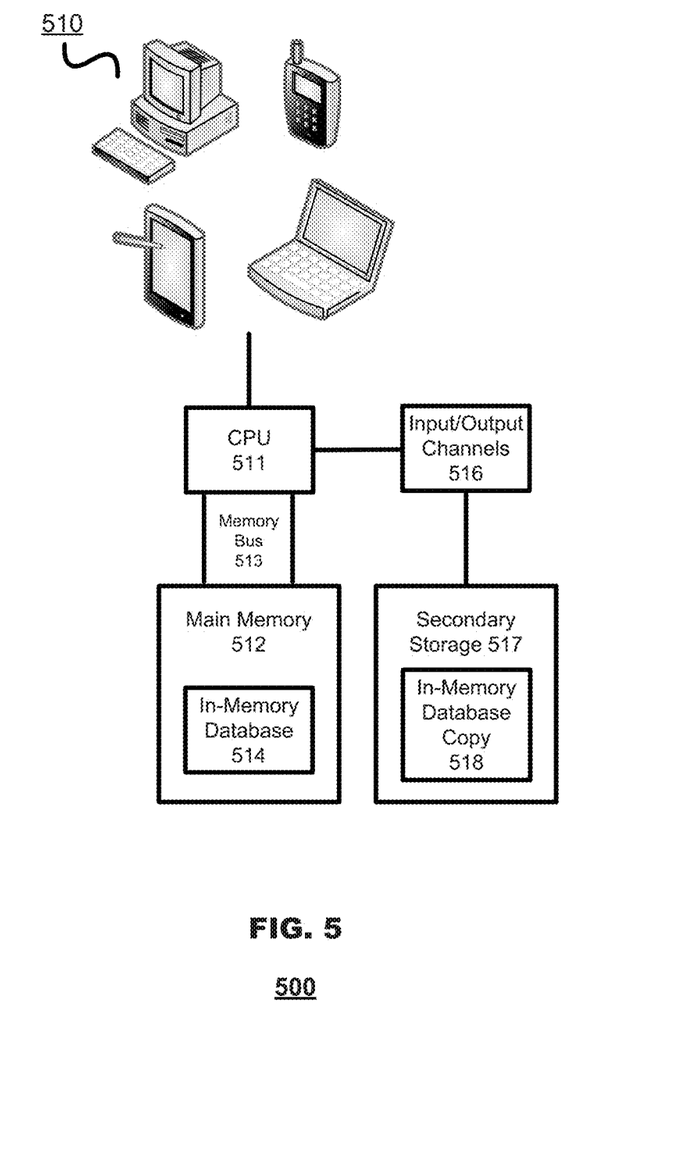
FIG. 5 is a block diagram showing an in-memory implementation of a database environment supporting temporary tables according to an exemplary embodiment.

FIG. 5 is a block diagram showing an in-memory implementation of a database environment supporting temporary tables according to an exemplary embodiment. Computer system 500 includes at least one client device 510, which may be one or more of the client devices 102, 104, 106, 108 described above with reference to FIG. 1. Client device 510 includes a CPU 511 and a main memory 512 directly accessible to CPU 511 via memory bus 513. Client device 510 further includes a secondary storage 517, in communication with the CPU 511 via input/output channels 516.

A relational database may be contained as in-memory databases in main memory 512 of client device 510. This is shown in FIG. 5 as in-memory database 514, but this disclosure is not limited to one in-memory database, and multiple in-memory databases may be stored. The in-memory database may also be copied into secondary storage 517 of computer system 510, as indicated by numeral 518, to allow for non-volatile storage of the in-memory database 514. In-memory database copy 518 may be kept current with updates and other changes made to in-memory database 514. The in-memory database 514 may be accessed by the client device 510 or any other device in wired, wireless, or network communication with the client device 510.

Global and local temporary tables in accordance with embodiments of the present invention may be used with the in-memory database 514, and many benefits of in-memory databases may be realized. For example, in-memory databases may deliver increased data access speed compared to relational databases stored outside of main memory, and consequently may provide faster program execution. Real-time program execution may also be implemented due to the increased speed of program execution. In-memory databases may also be accessed from desktop computers or portable devices such as laptop or tablet computers and smartphones, which may be placed in data communication using wired, wireless, or network connections.

It will be appreciated that there exist implementations of other variations and modifications of the invention and its various aspects, as may be readily apparent to those of ordinary skill in the art, and that the invention is not limited by specific embodiments described herein. Features and embodiments described above may be combined with and without each other. It is therefore contemplated to cover any and all modifications, variations, combinations or equivalents that fall within the scope of the basic underlying principals disclosed and claimed herein.

What is claimed is:

1. A computer system implementing a database environment comprising:
    a first client device hosting a database application session in which first and second database operations are requested, the first database operation request being written in SQL and specifying creation of a temporary database table available to multiple applications and multiple application instances, the first database operation request being generated by an ABAP Managed Database Procedures (AMDP); and
    an in-memory database system, including at least one database server hosting a database;
    wherein the database server creates a global temporary database table to store first intermediate data generated by the database operations in memory of the in-memory database;
    wherein the database server creates a local temporary database table to store second intermediate data generated by the database operations in memory of the in-memory database;
    wherein the first intermediate data stored in the global temporary database table is accessed by the second database operation;
    wherein the global temporary database table is available on a database layer, the global temporary table making the intermediate data available across (i) multiple applications and multiple application instances and (ii) multiple networked client devices or database servers while processing data populated within such temporary database table at the database layer rather than a remote application software layer;
    wherein, upon exit of the database application executing the first and second database application sessions, both of the global temporary and local database tables are deleted, without ever being written to persistent memory of the in-memory database system;
    wherein the global temporary database table and/or the local temporary database table is not stored in persistent memory;
    wherein the global temporary database table and/or the local temporary database table perform all functions, operations, queries, and routines that the database environment supports for a persistent table.

2. The computer system of claim 1, wherein the database is a relational database.

3. The computer system of claim 1, wherein the database is a non-relational database.

4. The system of claim 1 wherein at least one of the temporary database tables is generated by an ABAP Managed Database Procedure (AMDP).

5. A computer system implementing a database environment comprising:
    a first client device hosting a first database application session in which a first database operation is requested, the first database operation request being written in SQL and specifying creation of a temporary database table available to multiple applications and multiple application instances, the first database operation request being generated by an ABAP Managed Database Procedures (AMDP);
    a second client device hosting a second database application session in which a second database operation is requested;
    an in-memory database system, including at least one database server hosting a database;
    wherein the database server creates, during run-time, a plurality of temporary database tables to store intermediate data generated by the database operation in memory of the in-memory database system, the plurality of global temporary database tables including a global temporary database table and a local temporary database table; and
    wherein the intermediate data stored in the global temporary database table is accessed by the second database operation;
    wherein the global temporary database table is available on a database layer, the global temporary table making the intermediate data available across (i) multiple applications and multiple application instances and (ii) multiple networked client devices or database servers while processing data populated within such temporary database table at the database layer rather than a remote application software layer;
    wherein the local temporary database table is only available to a local instance of the first database application;
    wherein, upon exit of the database application executing the first and second database application sessions, the temporary database tables are deleted, without ever being written to persistent memory of the in-memory database system;
    wherein the global temporary database table and/or the local temporary database table is not stored in persistent memory;
    wherein the temporary database tables perform all functions, operations, queries, and routines that the database environment supports for a persistent table.

6. The computer system of claim 5, wherein the database is a relational database.

7. The computer system of claim 5, wherein the database is a non-relational database.

8. The system of claim 5 wherein at least one of the temporary database tables is generated by an ABAP Managed Database Procedure (AMDP).

9. A method of creating temporary database tables in an in-memory database, comprising:
    receiving at a database system a first database operation request from a client device, the first database operation request being written in SQL and specifying creation of a temporary database table available to multiple applications and multiple application instances, the first database operation request being generated by an ABAP Managed Database Procedures (AMDP);

creating, during run-time, a temporary database table in response to the first database operation request and while an operation specified by the first database operation request is performed;

populating the temporary database table with intermediate data generated in response to the database operation request;

allowing access to the temporary database table in response to a second database operation request from the first client device; and allowing access to the temporary database table in response to a third database operation request from a second client device;

wherein the temporary database table is a global temporary database table available on a database layer, the global temporary table making the intermediate data available across both of (i) multiple applications and multiple application instances and (ii) multiple networked client devices or database servers while processing data populated within such temporary database table at the database layer rather than a remote application software layer;

wherein, upon exit of a database application utilizing the global temporary database table, the global temporary database table is deleted, without ever being written to persistent memory of the in-memory database;

wherein the database application generates at least one local temporary database table storing data accessible solely to a local instance of the database application;

wherein the global temporary database table and/or the local temporary database table is not stored in persistent memory;

wherein the global temporary database table and/or the local temporary database table perform all functions, operations, queries, and routines that a database environment utilizing such temporary database tables supports for a persistent table.

10. The method of creating a temporary database table of claim 9, wherein the database system hosts a relational database.

11. The method of creating a temporary database table of claim 9, wherein the database system hosts a non-relational database.

12. The method of claim 9 wherein at least one of the temporary database tables is generated by an ABAP Managed Database Procedure (AMDP).

* * * * *